Oct. 4, 1955 H. H. ROYALL 2,719,475
AIR VENTILATED ROOF
Filed Nov. 19, 1951 2 Sheets-Sheet 1
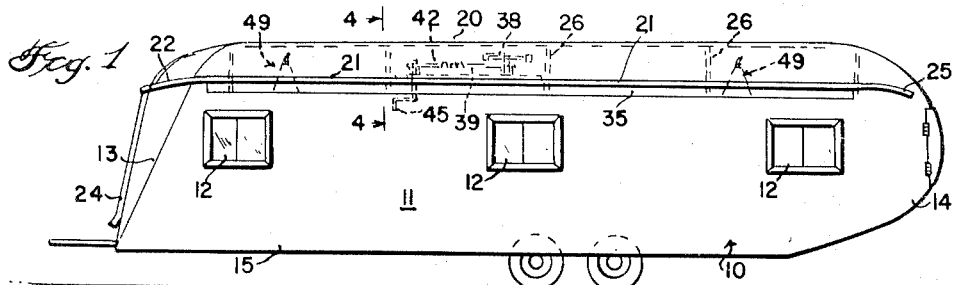
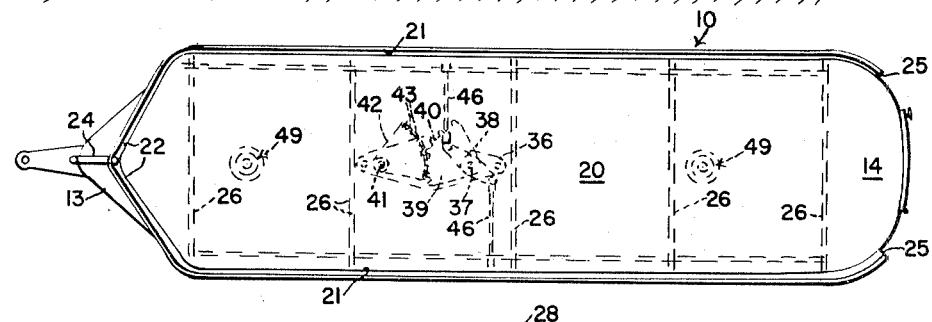
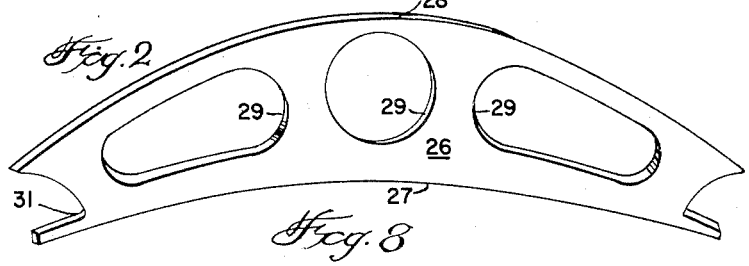
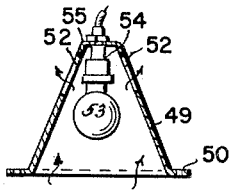
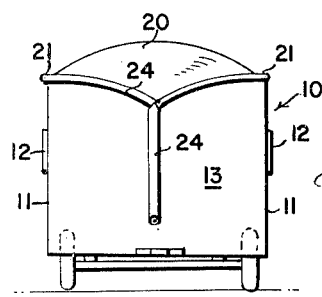
Inventor
HORACE H. ROYALL
By John N. Randolph
Attorney

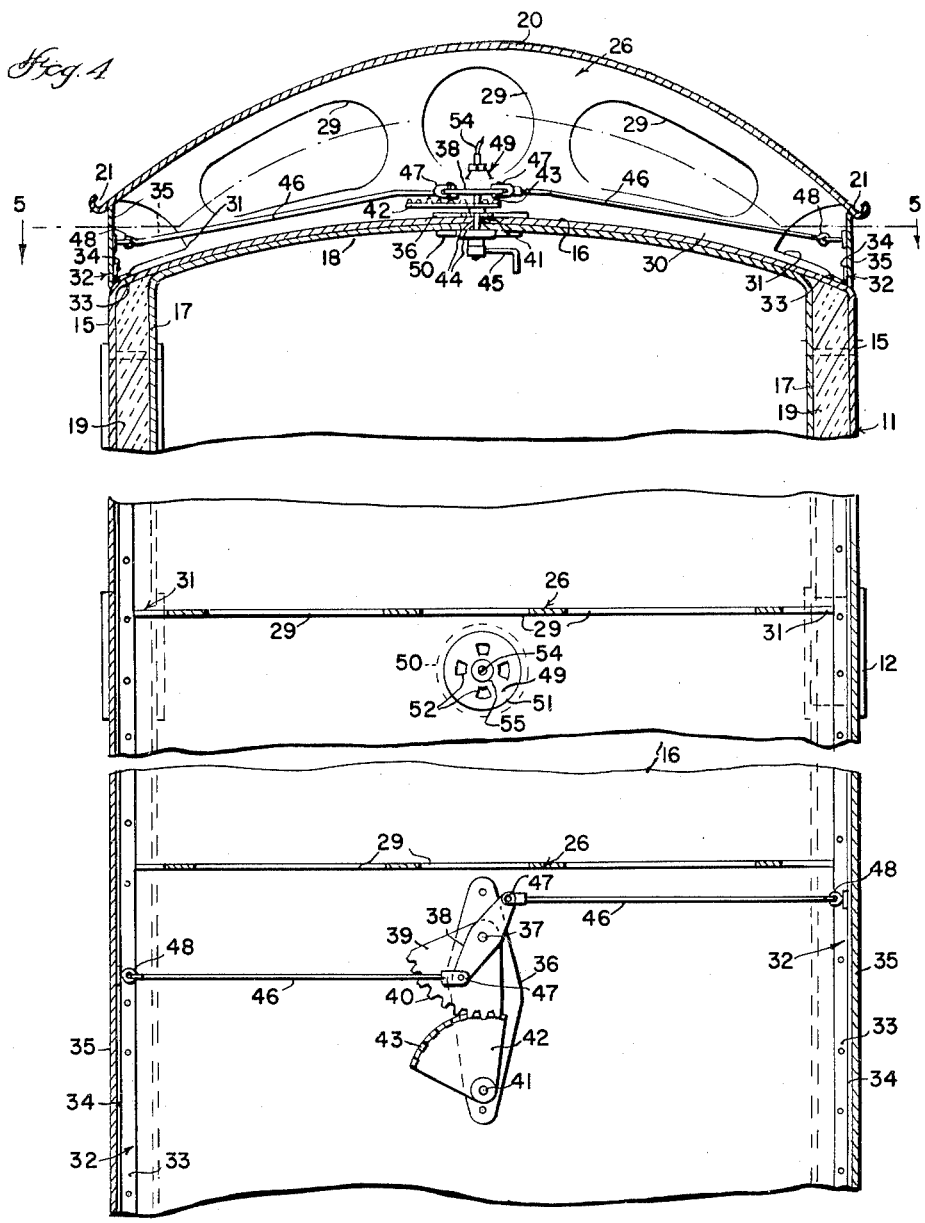

United States Patent Office 2,719,475
Patented Oct. 4, 1955

2,719,475

AIR VENTILATED ROOF

Horace H. Royall, Las Vegas, Nev.

Application November 19, 1951, Serial No. 257,078

1 Claim. (Cl. 98—2)

This invention relates to a ventilated all metal roof structure for primarily house trailers, and has for its primary object to provide a ventilating structure for a metal trailer having closure members capable of being manually moved to open positions to allow air to circulate through the trailer between the ceiling and roof thereof for ventilating an air chamber between the roof and ceiling to maintain the trailer in a cool condition, or which air chamber may be closed to form a dead air space or chamber above the ceiling for keeping the upper part of the trailer warm in cold weather.

Another object of the invention is to provide a trailer having ventilating means by which warm and foul air may escape from the interior of the trailer into the air chamber above the ceiling and by means of which a circulation of air may be maintained in the trailer when the air chamber above the ceiling is opened to the atmosphere to allow a continuous escape of warm air from the upper part of the interior of the trailer to thus maintain the trailer in a cool condition.

Still a further object of the invention is to provide a trailer having a novel manual control means for opening and closing the air chamber above the trailer ceiling.

A further object of the invention is to provide a trailer having an improved drainage means for the roof thereof to prevent drainage water from entering the air chamber beneath the roof when the trailer is either at rest or in motion.

Various other objects and advantages of the invention will hereinafter become more fully apparent from the following description of the drawings, illustrating a presently preferred embodiment thereof, and wherein:

Figure 1 is a side elevational view showing a preferred embodiment of the invention as shown in conjunction with one preferred type of trailer;

Figure 2 is a top plan view thereof;

Figure 3 is a front elevational view of the same;

Figure 4 is an enlarged fragmentary cross sectional view of the upper portion of the trailer taken substantially along a plane as indicated by the line 4—4 of Figure 1;

Figure 5 is a fragmentary horizontal sectional view taken substantially along a plane as indicated by the line 5—5 of Figure 4;

Figure 6 is a longitudinal sectional view of the meshing gear segments forming a part of the actuating unit illustrated in Figures 4 and 5;

Figure 7 is a vertical sectional view, partly in side elevation of an element of the ventilating apparatus, and Figure 8 is an enlarged perspective view of one of the roof supporting elements.

Referring more specifically to the drawings, the numeral 10 designates generally a house trailer constructed in accordance with the invention which is provided in each side wall 11 thereof with a plurality of spaced windows 12 each having a stationary pane and a longitudinally sliding pane. As best seen in Figure 4, the exterior of the trailer 11 is entirely of metal including its front end 13 and rear end 14, as seen in Figure 1, the said trailer having metal side walls 15 which merge at their upper edges with the longitudinal side edges of a metal ceiling 16 which is upwardly bowed from its side edges toward its longitudinal center portion. The side walls 15 extend downwardly from the side edges of the metal ceiling 16 to the bottom of the trailer 10, as illustrated in Figures 1 and 3. The trailer 10 also includes inner side walls 17 and an inner ceiling 18, which portions are formed preferably of plywood. The inner ceiling 18 is disposed against the underside of the metal outer ceiling 16 and is preferably shaped to conform to the shape of the ceiling portion 16. The side walls 17 extend downwardly from the side edges of the inner ceiling 18 to adjacent the bottom of the trailer 10 and are spaced inwardly from the metal side walls 15 to provide a space therebetween which is preferably filled with a heat and cold insulating material 19.

The trailer 10 also includes a metal roof 20 which is likewise upwardly bowed transversely so that its central longitudinal portion is disposed substantially above the level of its side edge portions. The said side edge portions of the roof 20 are turned outwardly and upwardly to form gutters 21 which extend from end-to-end of the roof 20, as illustrated in Figures 1 and 2. As best seen in Figures 2 and 3, the gutters 21 have downwardly converging portions 22 each extending half way across the upper part of the front wall 13, the merging ends of which connect with a down spout 24 the lower end of which discharges downwardly and forwardly adjacent the bottom of the front wall 13. The opposite ends of the gutters 21 extend to beyond the rear end of the roof and have downwardly and inwardly curved open rear ends 25 which discharge on either side of the rear end portion 14 of the trailer 10. The roof 20 is supported above and spaced from the upper metal ceiling portion 16 by a plurality of rafters or spacing members 26 which are interposed therebetween and which extend transversely of the trailer 10, each rafter 26 having a concavely arced bottom edge 27 which is disposed on and suitably secured to the upper surface of the ceiling portion 16 and a convexly arched upper edge 28 which is disposed against the underside of the roof 20 and suitably secured thereto. Each rafter 26 has a plurality of openings 29 to allow air to circulate in the chamber 30, between the ceiling member 16 and roof 20 and longitudinally of the trailer 10. The rafter members taper in width from intermediate of their ends of each of the ends thereof and the corresponding ends of each rafter member 26 is each provided with an outwardly opening notch 31.

As best illustrated in Figure 4, the gutters 21 are spaced outwardly with respect to the outer metal side wall portions 15 and are disposed substantially above the level of the side edges of the ceiling portion 16. One or a plurality of hinges 32 is disposed along each side edge of the ceiling portion 16 and has a leaf 33 thereof secured to the upper side of the ceiling portion 16, said leaves 33 being disposed beyond the ends of the rafters 26. The other leaf or leaves 34 of the hinge or hinges 32, respectively, disposed along each side of the trailer 10 extend upwardly from the ceiling portion 16 for swinging movement outwardly and inwardly with respect to the ventilating chamber 30. An elongated valve 35, constituting an elongated plate, is secured to the hinge leaf or leaves 34 located along each side of the trailer 10 and said valves 35 extend from end-to-end of the roof 20 and are of a width so that when disposed in upright positions, as illustrated in Figure 4, the upper edges of the valves 35 will engage the under surface of the roof 20 inwardly of and adjacent the gutters 21 and the bottom edges of said valves 35 will engage the side edges of the ceiling portion 16 to completely close the chamber 30, the end portions of which are closed by the end portions of the roof 20 which merge with the upper edges of the front and rear ends 13 and 14, respectively, of the trailer.

As best seen in Figure 5, an elongated plate 36 is secured to the upper surface of the ceiling portion 16 between two of the rafters 26 and has an upstanding stub shaft 37 which is journalled therein and rises therefrom and which is located substantially intermediate of the ends of the trailer 10. A crossarm 38 is secured intermediate of its ends to the upper portion of the shaft 37 and a segmental gear 39 is secured to the shaft 37 below the crossarm 38 and remote to the teeth 40 of the gear segment 39 which are concentrically disposed relatively to the shaft 37 and which are located in the same plane as the remainder of said gear segment 39, as best illustrated in Figure 6. A shaft 41 is journalled in the plate 36 adjacent its opposite end and a gear segment 42 is secured to the upper end of the shaft 41 above the plate 36 and remote to the teeth 43 of the gear segment 42 which are likewise disposed concentric to the shaft 41. The teeth 43, as best illustrated in Figure 6, are turned upwardly with respect to the plane of the gear segment 42 and are intermeshed with the teeth 40 of the gear segment 39, which latter gear segment is disposed slightly above the plane of the gear segment 42 so that its teeth 40 interfit between the teeth 43. As best seen in Figure 4, the shaft 41 extends downwardly through and is journalled in openings 44 of the ceiling members 16 and 18 and a crank 45 is secured to the lower end of the shaft 41 and is disposed beneath the ceiling 18. The crossarm 38 is connected at its ends to a pair of connecting rods or links 46, adjacent ends of which are pivotally connected at 47 to the ends of said crosshead or crossarm 48. The links 46 extend from the crosshead 38 in opposite directions and have their opposite ends swingably connected at 48 by interconnected eye members to the inner sides of the two valves 35.

A substantially frusto-conical light reflector 49 is mounted in ceiling 16, 18 adjacent each end of the trailer 10, each reflector 49 having an outturned apertured flange 50 at its enlarged lower end which is disposed against and secured to the underside of the ceiling member 18 to support the reflector thereon. The upwardly tapered portions of the reflectors 49 extend upwardly through openings 51 in the ceiling 16, 18 into the air chamber 30 and each of said reflectors 49 is provided adjacent its upper end with a plurality of relatively large spaced vent openings 52 located above the ceiling 16, 18. A lamp bulb 53 is supported in each reflector 49 by a lamp socket 54 which is detachably secured to and suspended from the restricted upper end 55 of the reflector.

The interior of the trailer 10 is illuminated by the lamp bulbs 53 and the heat therefrom escapes through the vent openings 52 into the air chamber 30. Likewise, heat and foul air will escape through the reflectors 49 from the interior of the trailer 10 into the air chamber 30. By manually turning the crank 45 in one direction, the crosshead 38 will be turned counterclockwise from its position of Figures 2 and 5 so that a pull will be exerted thereby on the links 46 to swing the valve members 35 inwardly and downwardly on the hinges 32 from their closed positions of Figure 4, the notches 31 of the rafters 26 accommodating this inward and downward movement of the valve members 35 to open positions. When the valve members 35 are thus opened, the air may circulate freely transversely through the air chamber 30 between the ceiling member 16 and roof 20 thus creating a draft in the chamber 30 which will cause heat, smoke and foul air to be drawn upwardly through the reflectors 49 from the interior of the trailer 10, which foul air, heated air and smoke may escape outwardly from either side of the chamber 30 through the openings provided by the opened valve members 35. Accordingly, by opening the windows 12 or otherwise admitting air to the interior of the trailer 10 circulation of air may be maintained therein so that the interior of the trailer may be kept in a cool and comfortable condition in hot weather. It will also be apparent that the overhanging gutters 21 will prevent rain from entering the chamber 30 and any rain water which might strike the open valve members 35 in a driving rain would be deflected downwardly and outwardly thereby away from the chamber 30. Additionally, the insulation 19 in the side walls 11 will further assist in maintaining the interior of the trailer in a cool condition. In cold weather the valves 35 are normally kept in a closed position so that the air in the chamber 30 is prevented from escaping therefrom and thus provides an air chamber below the roof 20 which will help to warm the interior of the trailer 10, the walls of which are insulated against cold by the insulation 19. However, even when the valves 35 are in closed positions, foul air and smoke may still escape from the interior of the trailer through the reflectors 49 into the chamber 30.

Various modifications and changes are contemplated and may obviously be resorted to, without departing from the spirit or scope of the invention as hereinafter defined by the appended claim.

I claim as my invention:

In a vehicle of the character described having a ceiling, a roof disposed above and spaced from the ceiling and combining therewith to define an air chamber between the ceiling and roof, said roof merging with the ceiling adjacent the ends of the vehicle for closing the ends of said air space, valve members swingably connected to the upper side of the ceiling adjacent the side edges thereof and having upper free edges engaging under the roof adjacent the side edges of the latter for closing the sides of the air chamber, said valve members being swingable inwardly and downwardly of the vehicle for opening the sides of the air chamber to permit air to circulate transversely of the vehicle through the air chamber between the ceiling and roof, and actuating means for moving the valve members to and from opened and closed positions, the said roof being upwardly bowed from side to side thereof and having side edge portions turned outwardly and upwardly to form gutters extending from end-to-end of the roof and to beyond the ends of the valve members, said ceiling being upwardly bowed from side to side thereof, and a plurality of longitudinally spaced transversely extending rafters disposed in the air chamber each having a bottom edge engaging on and secured to the upper side of the ceiling and an upper edge engaging beneath and secured to the roof, said rafters having openings permitting air to circulate therethrough longitudinally of the air chamber and notches opening outwardly of the ends thereof into which said valve members are movable when swung to open positions.

References Cited in the file of this patent

UNITED STATES PATENTS

| | | |
|---|---|---|
| 36,536 | Smith et al. | Sept. 23, 1862 |
| 1,303,410 | Stowell | May 13, 1919 |
| 1,778,591 | Genett | Oct. 14, 1930 |
| 2,089,060 | Harley | Aug. 3, 1937 |
| 2,145,222 | Gunter | Jan. 24, 1939 |
| 2,207,958 | Tuell | July 16, 1940 |
| 2,251,663 | Darbo | Aug. 5, 1941 |
| 2,576,354 | Oswald | Nov. 27, 1951 |
| 2,628,550 | King | Feb. 17, 1953 |

FOREIGN PATENTS

| | | |
|---|---|---|
| 616,300 | Germany | July 4, 1935 |